United States Patent
Ruggiero

(10) Patent No.: US 7,224,905 B2
(45) Date of Patent: May 29, 2007

(54) REMOTELY-INTERROGATED HIGH DATA RATE FREE SPACE LASER COMMUNICATIONS LINK

(75) Inventor: Anthony J. Ruggiero, Livermore, CA (US)

(73) Assignee: The Regents of the University of California, Oakland, CA (US)

( * ) Notice: Subject to any disclaimer, the term of this patent is extended or adjusted under 35 U.S.C. 154(b) by 494 days.

(21) Appl. No.: 09/827,454

(22) Filed: Apr. 6, 2001

(65) Prior Publication Data

US 2001/0035995 A1 Nov. 1, 2001

Related U.S. Application Data

(60) Provisional application No. 60/195,730, filed on Apr. 7, 2000.

(51) Int. Cl.
*H04B 10/00* (2006.01)

(52) U.S. Cl. ...................... 398/170; 398/119

(58) Field of Classification Search ........... 359/152, 359/154, 159, 300; 398/118, 119, 158, 169, 398/170
See application file for complete search history.

(56) References Cited

U.S. PATENT DOCUMENTS

| | | | | |
|---|---|---|---|---|
| 4,767,195 A | * | 8/1988 | Pepper | 359/276 |
| 4,949,056 A | * | 8/1990 | Akkapeddi | 359/334 |
| 5,038,359 A | | 8/1991 | Pepper et al. | 372/99 |
| 5,140,463 A | | 8/1992 | Yoo et al. | 359/559 |
| 5,317,442 A | * | 5/1994 | Sharp et al. | 359/170 |
| 5,371,368 A | | 12/1994 | Alfano et al. | 250/341.1 |
| 5,451,785 A | | 9/1995 | Faris | 250/330 |
| 5,519,723 A | * | 5/1996 | MacDonald | 372/99 |
| 5,576,627 A | | 11/1996 | McEwan | 324/639 |
| 5,578,185 A | | 11/1996 | Bergeron et al. | 205/123 |
| 5,625,458 A | | 4/1997 | Alfano et al. | 356/446 |
| 5,675,436 A | * | 10/1997 | Damen et al. | 359/561 |
| 5,738,101 A | | 4/1998 | Sappey | 128/665 |
| 5,920,588 A | * | 7/1999 | Watanabe | 372/96 |
| 5,936,739 A | | 8/1999 | Cameron et al. | 356/441 |

FOREIGN PATENT DOCUMENTS

| | | |
|---|---|---|
| EP | 0 801 452 A2 | 9/1997 |
| GB | 2 186 457 A | 8/1987 |
| WO | WO 98/35328 | 8/1998 |

OTHER PUBLICATIONS

Vasil'ev, Peter P. and Ian H. White. "Phase conjugation broad area twin-contact semiconductor laser." Applied Physics Letters 71 (1), Jul. 7, 1997.*

(Continued)

*Primary Examiner*—Christina Leung
(74) *Attorney, Agent, or Firm*—Michael C. Staggs; John H. Lee

(57) ABSTRACT

A system and method of remotely extracting information from a communications station by interrogation with a low power beam. Nonlinear phase conjugation of the low power beam results in a high power encoded return beam that automatically tracks the input beam and is corrected for atmospheric distortion. Intracavity nondegenerate four wave mixing is used in a broad area semiconductor laser in the communications station to produce the return beam.

44 Claims, 10 Drawing Sheets

OTHER PUBLICATIONS

P. Kurz, et al., "Highly efficient phase conjugation using spatially nondegenerate four-wave mixing in a broad-area laser diode," Feb. 26, 1996, Appl. Phys. Lett. 68, (9) pp. 1180-1182.

R. Hui, et al., "Optical Frequency Conversion Using Nearly Degenerate Four-Wave Mixing in a Distributed-Feedback Semiconductor Laser: Theory and Experiment," Dec. 1993, Journal of Lightwave Technology, vol. 11, No. 12, pp. 2026-2032.

R. W. Schirmer, et al., "Quantum theory of noise in phase conjugation by four-wave mixing in a two-level system," Apr. 1997, Physical Review A, pp. 3155-3163.

D. H. DeTienne, et al., "Semiconductor Laser Dynamics for Feedback from a Finite-Penetration-Depth Phase-Conjugate Mirror," May 1997, IEEE Journal of Quantum Electronics, vol. 33, No. 5, pp. 838-844.

M. Lucente, et al., "Spatial and frequency dependence of four-wave mixing in broad-area diode lasers," Nov. 14, 1988, Appl. Phys. Lett 53 (20), pp. 1897-1899.

M. Lucente, et al., "Nonlinear mixing and phase conjugation in broad-area diode lasers," 320 Applied Physics Letter, 53 Aug. 8, 1988, No. 6, New York, NY, USA, pp. 467-469.

J.P. Hall, et al., "Packaging of VCEL, MC-LED and Detector of 2-D Arrays," 1998 Electronic Components and Technology Conference, pp. 778-782.

P. Kurz, et al., "Phase conjugate reflectivity of 165% using four-wave mixing in a broad-area laser diode," Lasers and Electro-Optics Society Annual Meeting Conference Proceedings, IEEE, Oct. 30, 1995, pp. 410-411.

R. Lang, "Theory of Grating-Confined Broad-Area Lasers," IEEE Journal of Quantum Electronics, vol. 34, No. 11, Nov. 1998, pp. 2196-2209.

* cited by examiner

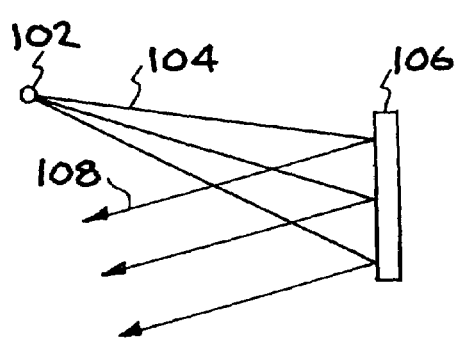
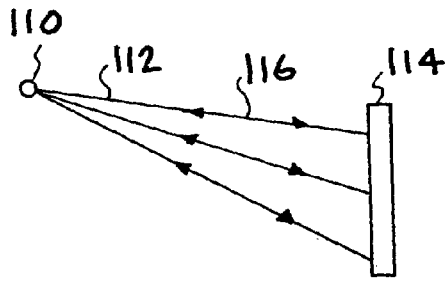
FIG. 1A  FIG. 1B
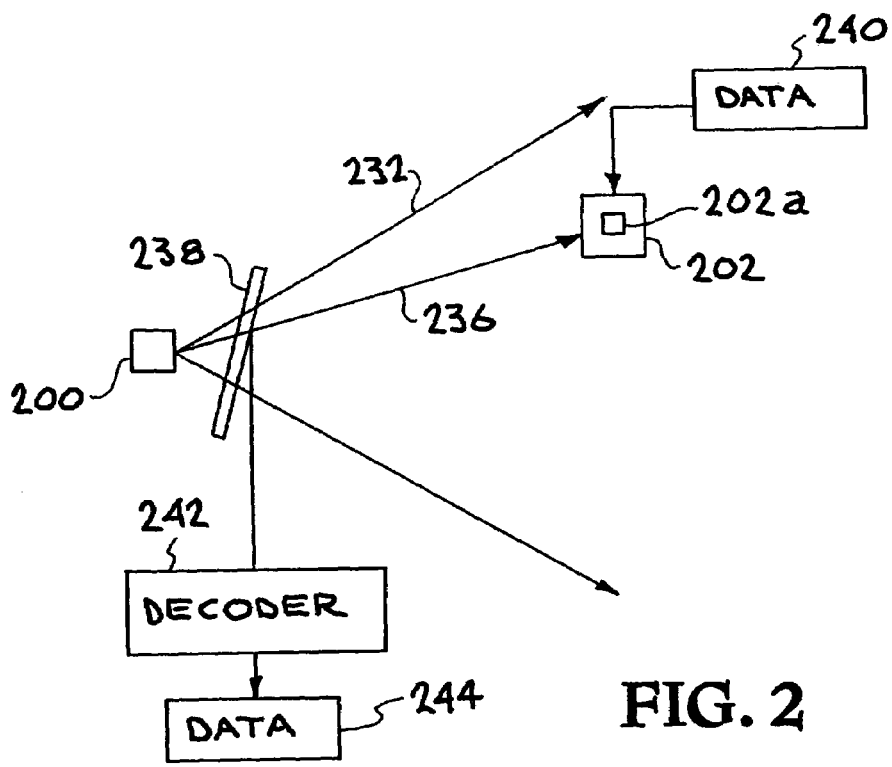
FIG. 2

REMOTELY-INTERROGATED HIGH DATA RATE FREE SPACE LASER COMMUNICATIONS LINK

RELATED APPLICATION

This application relates to U.S. Provisional Application No. 60/195,730 filed Apr. 7, 2000 and claims priority thereof.

The United States Government has rights in this invention pursuant to Contract No. W-7405-ENG-48 between the United States Department of Energy and the University of California for the operation of Lawrence Livermore National Laboratory.

FIELD OF THE INVENTION

The present invention relates communication devices, and more specifically, communication using optical phase conjugation to establish a communications link.

BACKGROUND OF THE INVENTION

Retro-modulator phase conjugate mirrors (RM-PCM) have been proposed in the past as a means of extracting information from remote sensors. FIG. 1A discloses an ordinary mirror 106 and FIG. 1B discloses a phase conjugate mirror 114. In an ordinary mirror 106, an incident laser beam 104 from a source 102 is reflected at an angle when it strikes the ordinary mirror 106 to form a reflected beam 108. FIG. 1B discloses an incident laser beam 112 from a source 110 striking the phase conjugate mirror 114, the resulting reflected light 116 retraces the original path back to the source 110. Phase conjugate mirrors have the unique property that the light reflected back to the source must exactly retrace its path. Consequently light reflected from a phase conjugate mirror can remove deletrious wavefront aberrations such as those due to small scale atmospheric turbulence as well as provide an automatic pointing and tracking function.

In order to produce a remotely interrogated phase conjugate communication link, the following sequence of events may occur as shown in FIG. 2. First, the probe beacon 232 from a source 200 illuminates the general area of a sensor 202 having a RM-PCM 202a with a broad beam. The RM-PCM 202a is an optical, passive device. Second, the RM-PCM 202a generates a retroreflected beam 236 by self-pumped phase conjugation, establishing a communication link (comlink) between the source 200 and the sensor 202. Third, the data 240 to be transferred from the sensor 202 is encoded on the return beam 236 by modulating the phase conjugate reflectivity of the RM-PCM 202a. The wavefront of the incident beam 232 is reversed or phase organized to produce the retroreflected beam 236. Fourth, the retroreflected beam 236 propagates back to the source 200 substantially retracing its path, correcting wavefront distortions, and providing automatic pointing and tracking. The retroreflected beam 236 reaches the source 200 where a beam splitter 238 intercepts the retroreflected beam 236, the output of the beam splitter 238 is decoded it in a decoder 242 and the data 244 is retrieved.

Temporal encoding of the RM-PCM permits a high signal to noise communications link to be established. Most low power nonlinear optical phase conjugation systems proposed for communication links are based on photorefractive effects in crystals. These methods often require mutual coherence between the signal (probe) beam and the pump beams and generally employ self-pumped non-collinear degenerate four-wave mixing configurations.

The angular rate of tracking between a mobile beacon and a stationary interrogated sensor is roughly the ratio of the system angular resolution ($\Delta\Theta=\lambda/d$) to the response time of the nonlinear phase conjugate element. Although low power phase conjugation with self-pumped photorefractive crystals can be useful in many applications, it suffers from the major limitation that the power transmitted in the retroreflected beam will always be a very small fraction of the probe beam, a large amount of probe beam power will be needed to initiate the link, and since the response time of photorefractive systems are inversely proportional to the incident intensity, the link will be limited to extremely low data and tracking rates (sub-kiloHertz (kHz)). For configurations that phase conjugate the retroreflected beam at the probe transmitter, more moderate laser powers can be used, but multiple round trips between the probe beacon location and the sensor must take place to establish a solid link. While operating powers can be relatively low in this configuration, a higher power probe beam is generally required to initiate the link. In addition, the laser coherence length must be greater than or equal to the pathlength to the sensor, making stable narrow linewidth laser operation a requirement for long range operation. Alternate photorefractive geometries based on mutually pumped phase conjugation can mitigate coherence requirements but can be substantially more complex and still suffer from inherent photorefractive response time limitations.

SUMMARY OF THE INVENTION

Aspects of the invention include system and method comprising: a transceiver constructed to transmit an interrogating beam; a communication station capable of receiving said interrogating beam; the communication station having a plurality of micro-phase conjugators arranged in an array.

Further aspects of the invention include a system and method comprising: transmitting an interrogating beam from a transceiver; receiving said interrogating beam at a communication station; encoding data onto a phase conjugate beam data and pumping the encoded phase conjugate reflectivity by nondegenerate four wave mixing; and transmitting the encoded phase conjugate beam back to the transceiver

BRIEF DESCRIPTION OF THE DRAWINGS

The accompanying drawings, which are incorporated into and form a part of the disclosure, FIG. 1A discloses a schematic diagram of the operation of an ordinary mirror;

FIG. 1B discloses a schematic diagram of the operation of a phase conjugate mirror;

FIG. 2 discloses a block diagram showing the establishment of a communications link using a retro-modulator phase conjugate mirror (RM-PCM);

DETAILED DESCRIPTION OF THE EMBODIMENTS

Enclosed herein is a system and method to enhance line-of-site communication performance, integration, and interoperability between ground to ground, ground to air, and air to air by solving increasingly dominant communication bottlenecks. The system and method described herein may use a high data rate (Gigabit (Gbit)/second (sec)), remotely-interrogated laser communications system (RILCS) based on nonlinear optical semiconductor laser micro-phase conjugators (also known herein as active retro-modulated micro-phase-conjugators (ARMPCs)). Broad area diode laser micro-phase conjugators function as actively-modulated retroreflectors which amplify and encode an interrogating laser beam and return it precisely to the beam source. The term "broad area" will be used herein to indicate that the micro-phase conjugators are large aperture phase conjugators in a semiconductor device. An aperture may be defined as the acceptance opening or input of a phase conjugate system. Therefore, the aperture which receives an incoming laser beam may be greater than the wavelength of the laser beam. Broad area also indicates that the micro-phase conjugators are multimode (spatially). Applications may include any communication between a mobile platform and a stationary platform, between two mobile platforms or between two stationary platforms. The mobile platform may be a car, airplane, satellite, etc. More specifically, applications include, but are not limited to, data uplinks from covert emplaced sensors to unmanned aerial vehicles (UAVs), data downlinks from UAVs to ground-based units, air-to-air data transfer between aircraft performing, for example, wide area near real-time reconnaissance, surveillance, and target acquisition missions. Further applications include satellite (including microsatellite) to satellite communication (with the phase conjugate beam correcting for pointing and tracking errors) and satellite to ground communication.

Figure 3A:
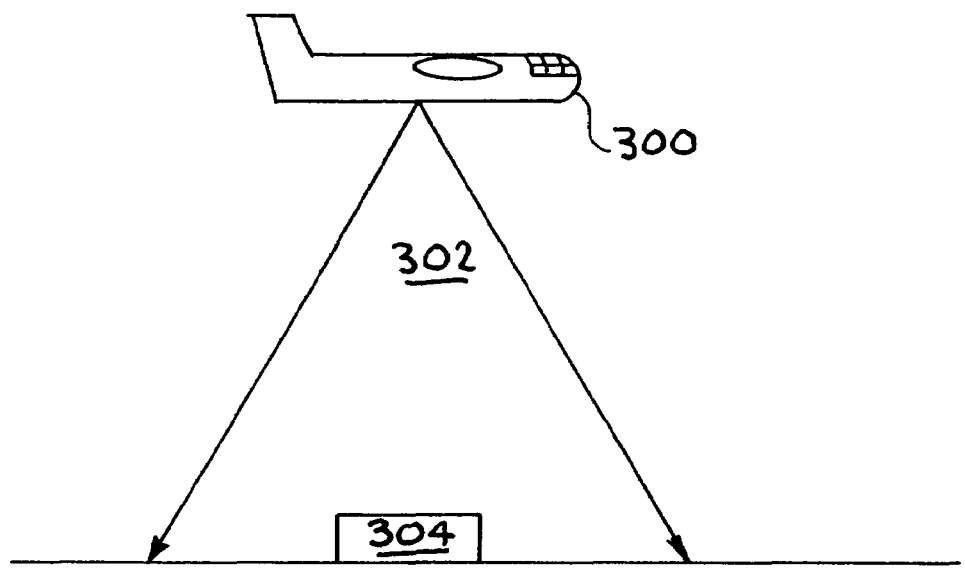
FIG. 3A illustrates an elevational view of a mobile platform transmitting an interrogating beacon to a ground based sensor having a broad area diode laser micro-phase conjugator (or actively modulated retro-reflector)
Figure 3B:
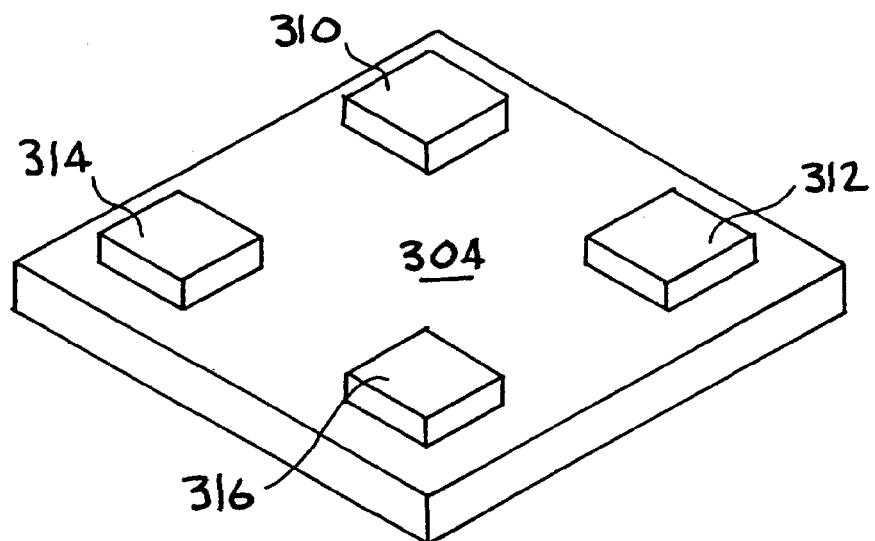
FIG. 3B is a perspective view of the sensor of FIG. 3A.
Figure 3C:
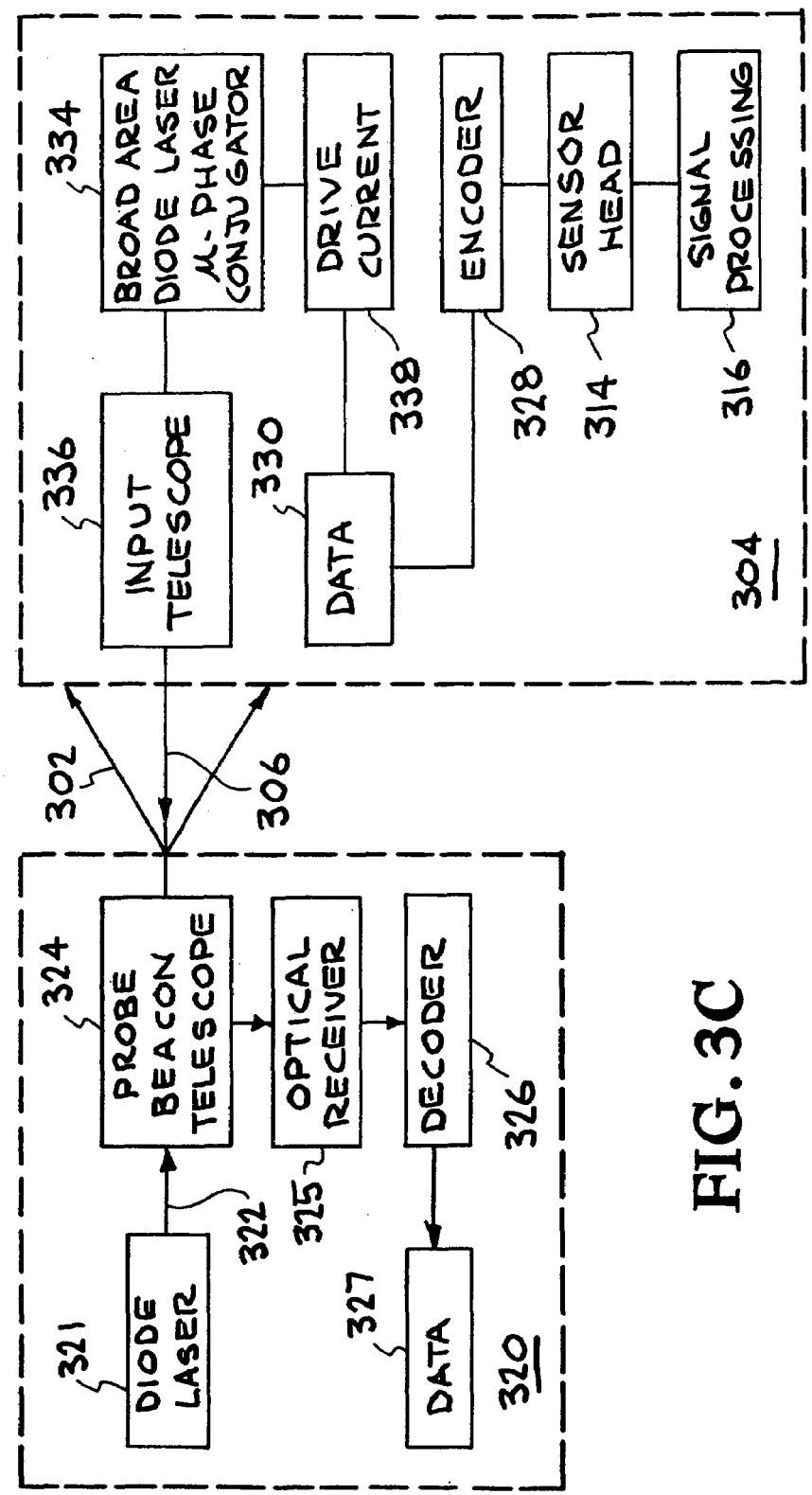
FIG. 3C is a block diagram of a communication link between a transceiver mounted on the mobile platform and the sensor of FIG. 3A.

FIG. 3A illustrates a mobile platform 300 (e.g., aerial platform, UAV, high altitude long endurance (HALE) platform, airplane, etc.) transmitting an interrogating beacon 302 to a ground based sensor 304 having a semiconductor laser micro-phase conjugator. Data from the sensor 304 is then encoded onto the interrogating beam and a retroreflected or return beam 306 is sent back to the aerial platform 300. FIG. 3B is a perspective view of the sensor 304. Sensor 304 receives the interrogating beacon 302 at the RM-PCM 310 having a broad area diode laser micro-phase conjugator. Sensor 304 further includes a radio-frequency/global positioning service (RF/GPS) antenna to determine the location of the sensor 302, a sensor head 314 to collect data about the surroundings and signal processing electronics 316 to process the collected data. Sensor head 314 may be a chemical sensor to detect information such as harmful gases, etc. that may be encoded as data and sent to the mobile platform 300. (In another application, the sensor head 314 may contain instrumentation for determining trembling in the ground which would indicate passing of vehicles or an earthquake). FIG. 3C illustrates a block diagram of a transceiver 320 mounted on the aerial platform 300 and the sensor 304. In operation, diode laser 321 transmits a continuous wave 322 to a probe beacon telescope 324. The diode laser 321 may be a frequency stabilized single frequency 1550 nm diode laser used in conjunction with an erbium doped fiber amplifier (EDFA). Frequency stabilization of the diode laser 321 may be achieved using opto-electronic laser stabilization electronics. Probe beacon telescope 324 transmits an interrogating beam 302 in the general direction of the sensor 304. The sensor 304 receives the interrogating beam 302 through an input telescope 336 which is coupled to the RM-PCM having a broad area diode laser micro-phase conjugator 334. The broad area diode laser micro-phase conjugator 334 will receive the interrogating beam 334 and will return a phase conjugate beam encoded with data collected by the sensor head 314 to the transceiver. The interrogating beam 302 operating at frequency $\omega_1$ contains phase information regarding the atmospheric distortions and will essentially trigger the diode laser oscillator of the broad area diode laser micro-phase conjugator 334 to pump the encoded phase conjugate beam via intracavity nondegenerate four wave mixing (NDFWM) (which is discussed in detail below). Encoding of the phase conjugate beam at approximately 1 kHz to approximately 10 GHz (and typically approximately 1 GHz to approximately 10 GHz) rates is accomplished by modulating the current to the broad area diode laser micro-phase conjugator 334. Sensor head 314 collects the data which is to be transmitted in cooperation with the signal processing electronics 316 and transmits the data to an encoder 328. The data transmission from the sensor head 314 and signal processing electronics 316 may be continuous (i.e., either real-time data collection or same data repeatedly transmitted over and over again) or may be triggered by a sensor (not shown) which detects the interrogating beam 302. Encoded data 330 is sent from the encoder 328 to the drive current controller 338. The drive current controller 338 modulates the encoded data onto the interrogating beam 302 in the broad area diode laser micro-phase conjugator 334 by controlling the current to the broad area diode laser micro-phase conjugator 334. An encoded phase conjugate beam 306 is transmitted back on the same path as the interrogating beam 302 to the transceiver 320. The probe beacon telescope 324 at the transceiver 320 collects the encoded phase conjugate beam 306, separates it from the outgoing interrogating beam with a fiber optic circulator (not shown) and transmits the signal to an optical receiver 325 and decoder 326 which decodes the encoded signal and retrieves the data 327. (An InGaAs avalanche diode may be used in the receiver 325).

The minimum amount of probe power to perform the interrogation of the sensor 304 by the transceiver 320 will depend on the specific details of the optical design and NDFWM configuration, for example, the detuning between the pump and probe frequencies and resonance structures of the device. Actual power requirements will also depend on the desired range of the communications link (comlink) and transceiver aperture requirements. Communications links may range in distance from approximately 0.1 to 2 centimeters on the lower end of the range to approximately 1 to 5 meters on the upper end of the range in an optical interconnect application (discussed in detail below); approximately 1 meter on the lower end of the range to approximately two to five kilometers on the upper end of the range in an automobile to stationary platform application; from approximately 5 kilometers to approximately 25 kilometers in remote interrogation of the broad area diode laser micro-phase conjugator 334 from an aerial mobile platform; and approximately 100 to approximately 5000 kilometers in satellite applications.

In an alternative embodiment, heterodyne detection of the retroreflector beam at the transceiver 320 using the interrogating beam wavelength as the local oscillator would also be possible for increased detection sensitivity thereby further reducing the overall power budget of the communications link.

Figure 3D:
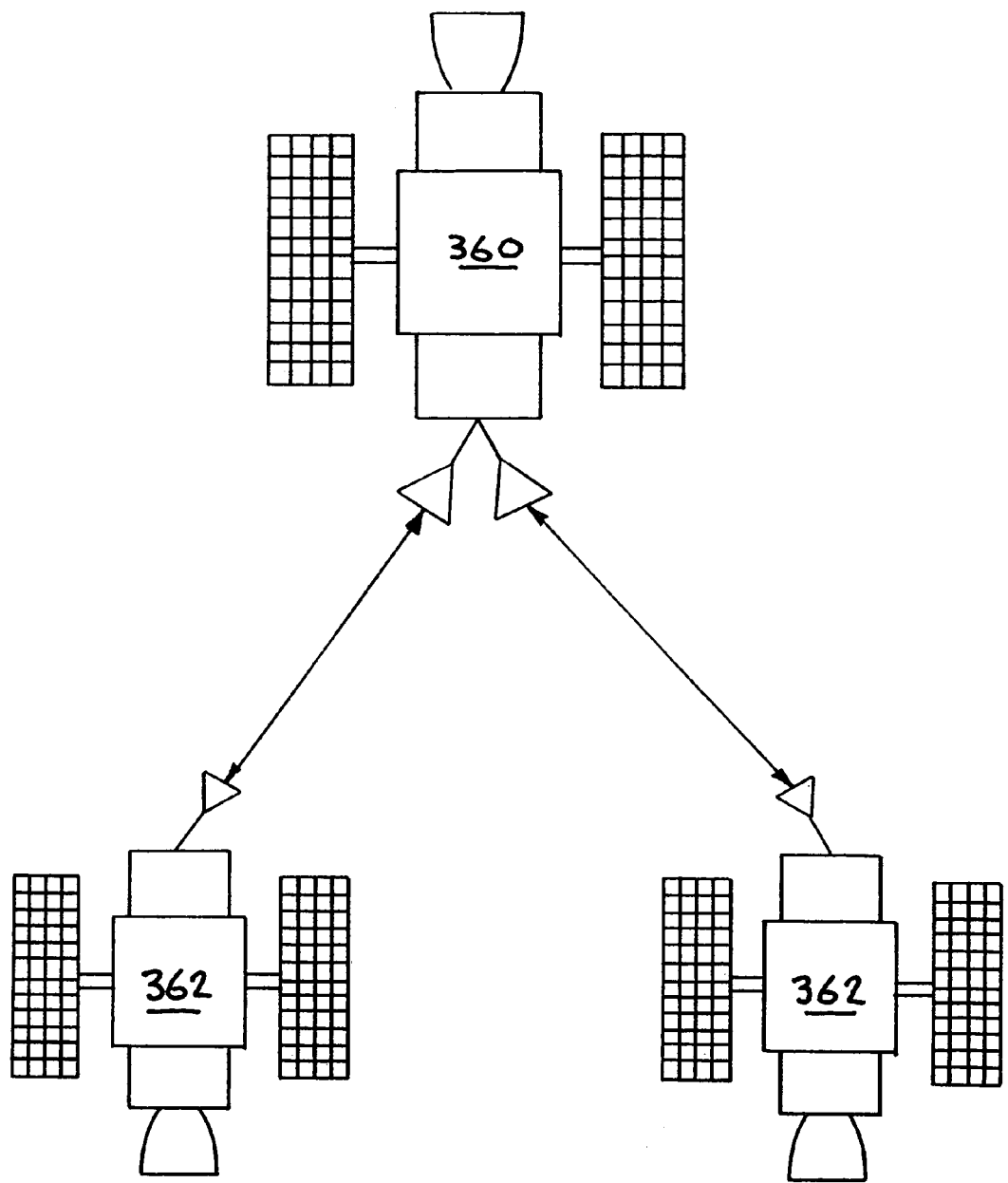
FIG. 3D is a perspective view of an alternative arrangement wherein the mobile platform is a geosynchronous satellite forming communication links with a plurality of mobile platforms (at least two low earth orbit satellites)

FIG. 3D illustrates an alternative application in which the mobile platform is a geosynchronous satellite 360 instead of an airplane and the geosynchronous satellite 360 forms communication links as described above with a plurality of low earth orbit satellites 362 instead of a ground based sensor.

Figure 4:
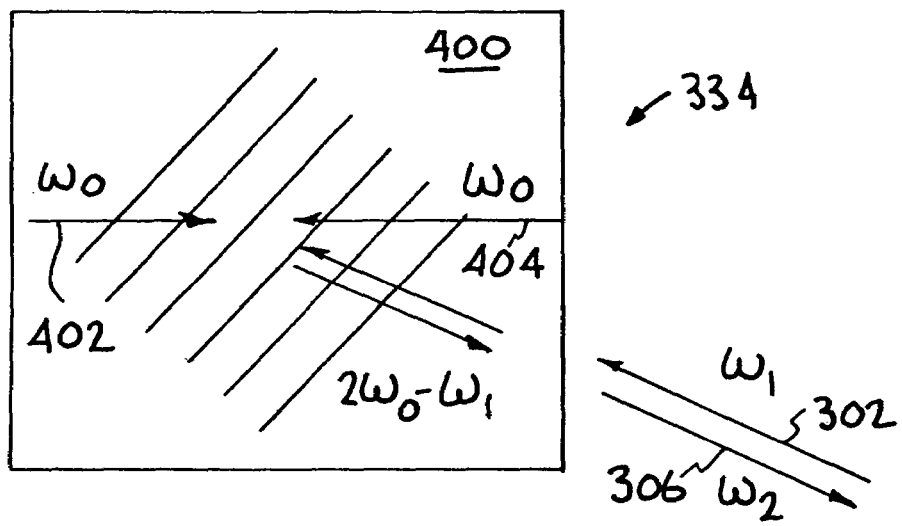
FIG. 4 is an elevational view of an the operation of an RM-PCM based on non-degenerate four wave mixing (ND-FWM) in broad area semiconductor laser diodes used in the system and method described herein.

FIG. 4 is an elevational view of the non-degenerate four wave mixing (NDFWM) in broad area (multimode) semiconductor laser diodes 334 (rather than passive photorefractive crystals) used in the RM-PCM system and method described herein. An advantage of NDFWM is that it does not require coherence between the pump beams 402, 404 and the interrogating beam 302. An interrogating or probe beam 302 at frequency $\omega_1$, injected into the laser cavity 400 of the broad area diode laser micro-phase conjugator 334 to interact with two intracavity, counterpropagating pump waves 402, 404 at frequency $\omega_0$, will generate a phase conjugate beam 306 at a frequency, $\omega_2$, equal to $2\omega_0-\omega_1$. Phase conjugation by four wave mixing in laser diodes uses the intracavity laser beams 402, 404 as pump beams for the four wave mixing process. The nonlinear susceptibility involved in the four wave mixing process may be substantially enhanced by optical gain and cavity feedback. The physical mechanism behind the phenomena of NDFWM is explained by the theory of dynamic carrier pulsation at the beat frequency of the intracavity propagated waves. Broad-area, angle-distributed feedback lasers are device structures that are well-suited for phase conjugation via intracavity four-wave mixing. Lateral grating confinement in a broad area multimode waveguide results in stable single longitudinal and transverse modes. Even when the wavefront is incompletely sampled by the phase conjugator 334, compensation of low frequency spatial components may be sufficient for automatic pointing and tracking functions. Narrow frequency bandwidths of less than approximately 10 MegaHertz (MHz) may be obtained in a fundamental spatial mode at output powers on the order of 1 Watt (W) out of a $300 \times 10^{-6}$ meter (μm) aperture. As discussed above, an aperture is the acceptance opening or input of a phase conjugate system. With these intense intracavity pump beams, all that is needed is an external interrogating signal beam to be injected into the cavity of the laser diode to produce efficient four wave mixing. The system and method described herein may achieve approximately 20 dB or greater gains in phase conjugate signals with less than approximately 10 nanoWatts (nW) of injected probe power.

In the disclosed system and method, two dimensional phase conjugation may be used. (Typically, phase conjugation by four-wave mixing in diode laser systems has been restricted to one dimensional systems. This is due to the fact that commercial broad area diodes are designed as thin rectangular gain stripes that are nominally 1000 to 2000 μm long with 100 to 300 μm wide by 1 to 2 μm high emitter apertures. The thin gain stripe permits efficient electrical to optical conversion via current confinement in the short direction). For high fidelity phase conjugation, the aperture of the broad area semiconductor laser diode 334 should resolve substantially all (or a "substantial portion" of) the spatial components of the input wavefront of the interrogating beam. ("Substantial portion" may be defined as greater than 60% and ideally greater than 80%). In other words, the degree of compensation depends on whether the broad area semiconductor laser diode aperture is large enough, and the field of view (or more precisely the number of spatial modes) is sufficient to resolve the atmospheric aberrations.

There are least four ways to achieve two dimensional phase conjugation in diode systems.

Figure 5A:
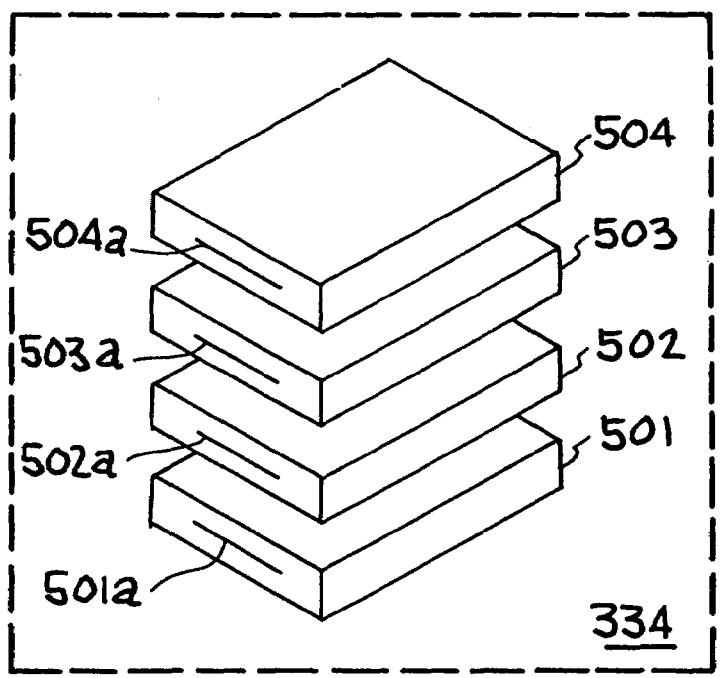
FIG. 5A is a perspective view of a first approach to obtain two dimensional phase conjugation in diode systems using a broad area diode laser micro-phase conjugator having a plurality of stacked commercial single stripe diodes.

A first approach illustrated in FIG. 5A incorporates a plurality of commercial single stripe devices 501, 502, 503 and 504 (with gain stripes indicated by 501a, 502a, 503a, and 504a) in the broad area diode laser micro-phase conjugator 334. The broad area diode laser micro-phase conjugator 334 utilizes aperture synthesis with a plurality of lasers to form a two dimensional array to sample the wavefront of the interrogating beam 302. The array may be formed a stacked single stripe devices or spaced apart to form a substantially linear array. The array may have a plurality of columns and a plurality of rows depending on the application. For example, as shown in FIG. 5A, the single stripe devices 501, 502, 503 and 504 may form a substantially linear array of at least four devices.

Figure 5B:
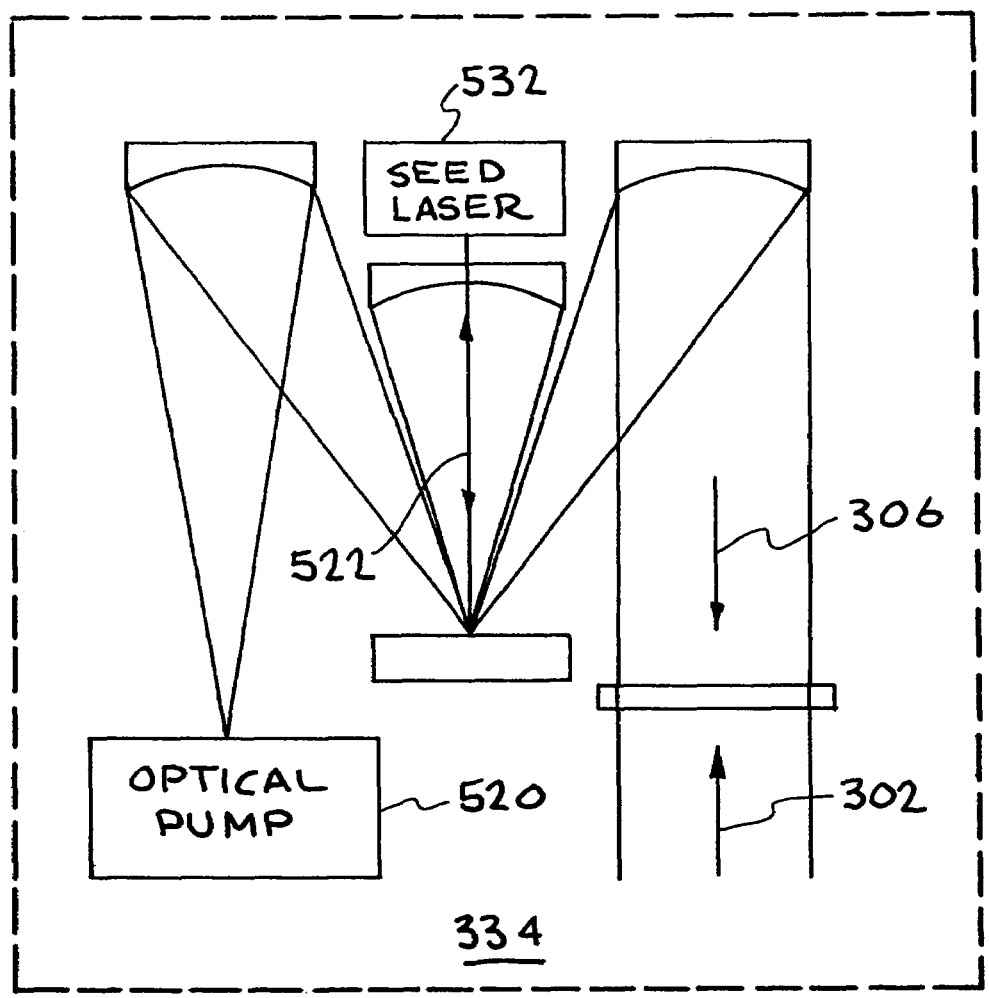
FIG. 5B is an elevational view of a second approach to obtain two dimensional phase conjugation in diode systems using a broad area diode laser micro-phase conjugator having a vertical cavity surface emitting laser (VCSEL)

A second approach illustrated in FIG. 5B incorporates large mode area vertical cavity surface emitting lasers (VCSELS) in the broad area diode laser micro-phase conjugator 334. These intrinsically two dimensional systems are commercially available with approximately 20 to approximately 30 μm diameter apertures. In this implementation, optical pump 520 is used to insure uniform gain across a large laser aperture, the external VCSEL resonator may control the spatial mode of the intracavity pump beams 522, while an external seed laser 523 (or line narrowing element) insures single longitudinal mode operation. The second resonator may be used to amplify the interrogating beam 302 and the phase conjugate beam 306. In a VCSEL, the interrogating beam 302 and the optical pump beam are substantially parallel (and maybe collinear). The potential for high fidelity wavefront correction using a VCSEL is possible. However, pump lasing frequency, polarization and longitudinal mode characteristics of large aperture VCSELs are difficult to control. Using external pump injection to stabilize the pump frequency and transverse mode profile, will be extremely sensitive to operating parameters. Also, attempts to modulate these devices may cause them to run multimode and phase conjugation efficiency may be substantially reduced. The broad area diode laser micro-phase conjugator 334 may include one VCSEL or an array of a plurality of VCSELs.

Figure 5C:
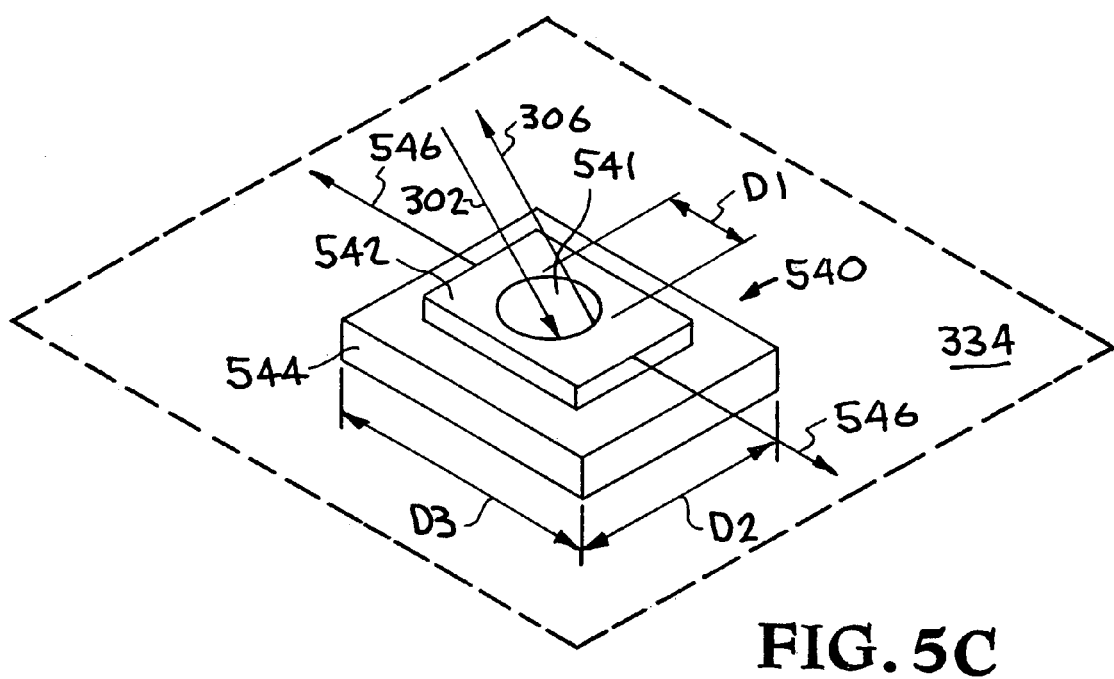
FIGS. 5C and 5D are perspective views of a third approach to obtain two dimensional phase conjugation in diode systems using a broad area diode laser micro-phase conjugator having a modification of a broad-area, distributed feedback (α-DFB) laser to allow the interrogating beacon to access the gain stripe through an aperture in the top of the device.
Figure 5D:
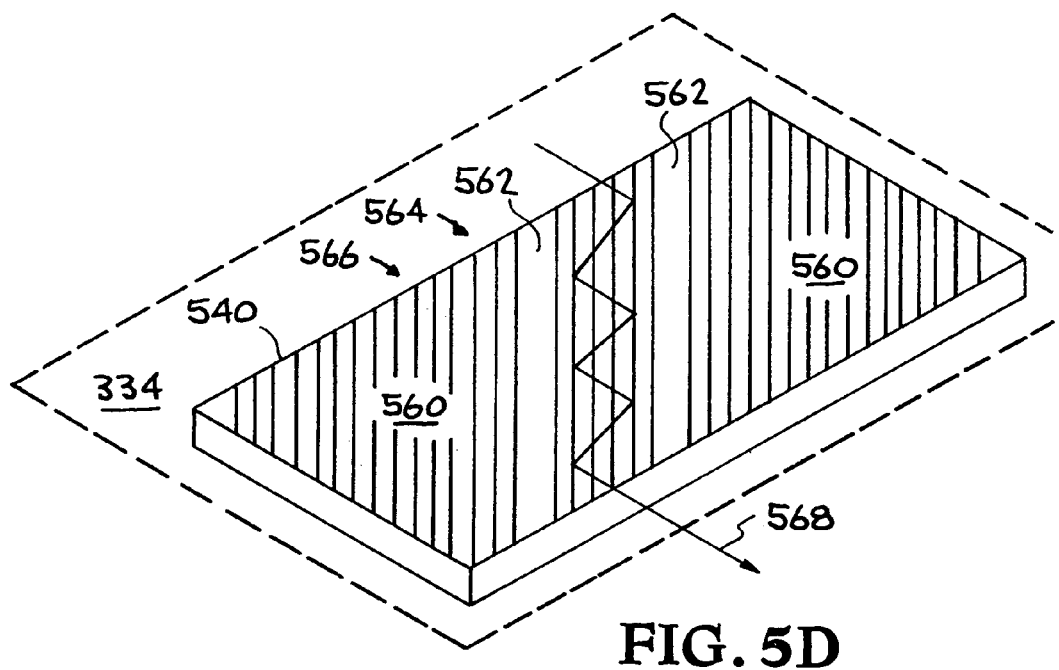

A third approach (and the preferred embodiment) is illustrated in FIGS. 5C and 5D and incorporates modification of a broad-area, distributed feedback (α-DFB) laser device 540 to allow the interrogating beam 302 to access the gain stripe of the broad area diode laser micro-phase conjugator 334 through the top electrode 542 of the device 540. The interrogating beam 302 interacts with the pump beams 546 at a substantially transverse (or substantially perpendicular) angle. Incorporation of an approximately 80 to 120 µm (typically approximately 100 µm) diameter aperture 541 (dimension D1) in the top electrode 542 of an approximately 300 µm (dimension D2) by approximately 2000 µm (dimension D3) device structure will have a negligible effect on the intracavity laser power while allowing sufficient aperture and angular acceptance for high fidelity conjugation. (In an alternative embodiment, the aperture may be substituted with a transparent top electrode 542). Reference numeral 544 indicates a bottom electrode. The modified broad-area, distributed feedback (α-DFB) laser device 540 may be angled-grating semiconductor which is a high-powered, two dimensional, electrically pumped semiconductor laser. In addition, the device 540 allows a broad interaction region and single spatial-mode and single frequency operation. The device 540 may contain embedded gratings that restrict operation to a single spectral mode. Also, the broad area region of the device 540 may act as a resonator with a bi-directional optical mode.

FIG. 5D is another view of the modified broad-area, distributed feedback laser device 540. Angled embedded diffraction gratings 560 assist in achieving high power output, single spatial and spectral modes, and a diffraction limited beam with a near-Gaussian far-field intensity profile. Reference numeral 562 indicates an angled contact which may be substantially parallel to the grating 560. Reference numeral 564 indicates a highly reflective coating and reference numeral 566 indicates an AR coating. Reference numeral 568 indicates the phase conjugated beam. Since the gratings 560 are angled with respect to the light path of the resonating mode, the narrow spectral and angular reflectivity bands of the gratings 560 provide extremely selective filtering of both spatial and spectral modes in a broad area device. A broad pump stripe, which may also be angled along the direction of the grating teeth, defines the region of gain within the resonant cavity. The epitaxial structure is similar to that of a conventional DFB or DBR laser diode. However, the grating pitch is predetermined to diffract the design wavelength at a substantially oblique incidence angle Θ rather than at 90 degrees. Consequently, light at the design wavelength traveling perpendicular to the end reflector will be diffracted by the gratings 560. After a second diffraction event, the light again travels in a direction normal to the other end reflector, only now it is laterally displaced from its original path. This path is illustrated by FIG. 5E.

Figure 5E:
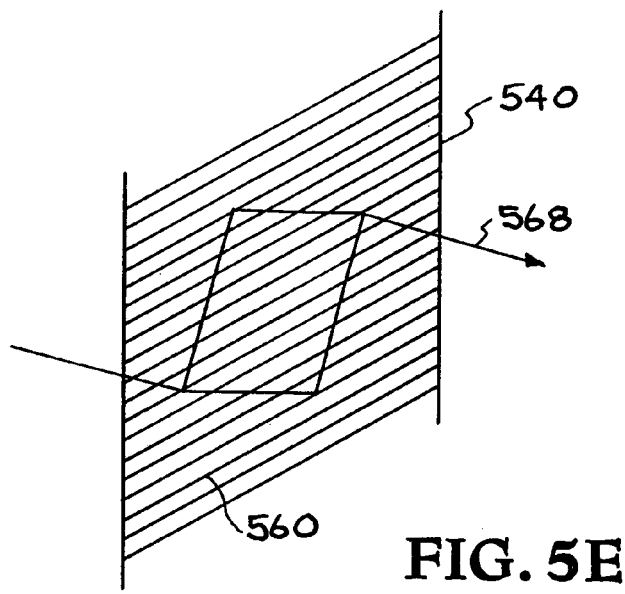
FIG. 5E is a perspective view of intracavity laser operation of the modified broad-area, distributed feedback laser of FIGS. 5C and 5D.

FIG. 5E illustrates a perspective view of intracavity laser operation of the modified broad-area, distributed feedback laser 540. Only for reflection at precisely normal incidence to the end mirror will the returning beam satisfy Bragg condition of the grating 560 and establish a resonant cavity. In this way, a single envelope may be smoothly varying across and along the cavity, the modes may be broad and quasi-planar in phase front, the optical field may be primarily localized to the active regions by the gratings 560, the bi-directional pump beams may be electrically driven, the device may be bonded junction side down for back side illuminated grating at angled incidence provides sufficient spectral and spatial filtering to obtain single lateral mode and single longitudinal mode operation across a wide aperture. As lasers these devices may achieve 1.5 W continuous wave (cw) diffraction-limited output near 1.55 µm in InP structures.

Advantages of this substantially transverse intracavity approach include: 1) large angular bandwidth for the substantially perpendicular FWM mixing geometry, 2) convenient management of parasitic back-reflections into the primary laser cavity, 3) rejection of residual pump beam radiation from the transmitter aperture with minimal filtering, 4) unhindered access to lasing pump beam for additional performance controls and 5) opportunity for monolithic vector phase conjugation of unpolarized input beams with proper choice of pump beam polarization.

Figure 5F:
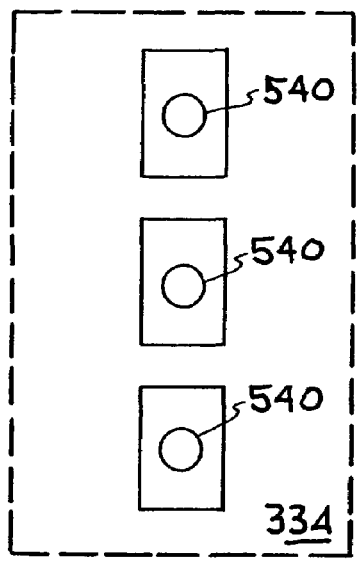
FIG. 5F is an elevational view of fourth approach to obtain two dimensional phase conjugation in diode systems using a broad area diode laser micro-phase conjugator having the modified broad-area, distributed feedback lasers in a substantially linear array arrangement.

A fourth approach is illustrated in FIG. 5F a plurality of the modified broad-area, distributed feedback lasers 540 are placed in a stacked or substantially linear array arrangement in the micro-phase conjugator 334. (In an alternative embodiment, the array may have a plurality of rows and a plurality of columns). FIG. 5F shows that the modified broad-area, distributed feedback lasers (i.e., with the aperture located in the top electrode) may have at least three devices.

Efficient optical coupling of the probe beacon into the optical semiconductor laser micro-phase conjugators (or ARMPC) is desired to producing phase conjugate transceivers with low prime power requirements. It primarily determines the amount of laser power required from the transceiver (or beacon) to initiate the communications link. Once the communications link is established, the phase conjugation process will guarantee that the coupling is optimal and alignment insensitive. The intrinsic greater than approximately 20 dB (typically in the range of approximately 30 to approximately 40 dB gain) in the ARMPCs will produce a retroreflector beam with sufficient power to close the communications link over long ranges. Absolute power of the retro-beam is determined by the four-wave mixing conversion efficiency and the rated output power of the broad area laser diode used in the device. Optimally designed coupling optics should yield approximately 75 to 80% coupling efficiencies for light collected by the receiver telescope or high numerical aperture multimode fiber into the broad area diode phase conjugator. Design of the coupling optics and receiver telescope may determine an optimal aperture.

Figure 6A:
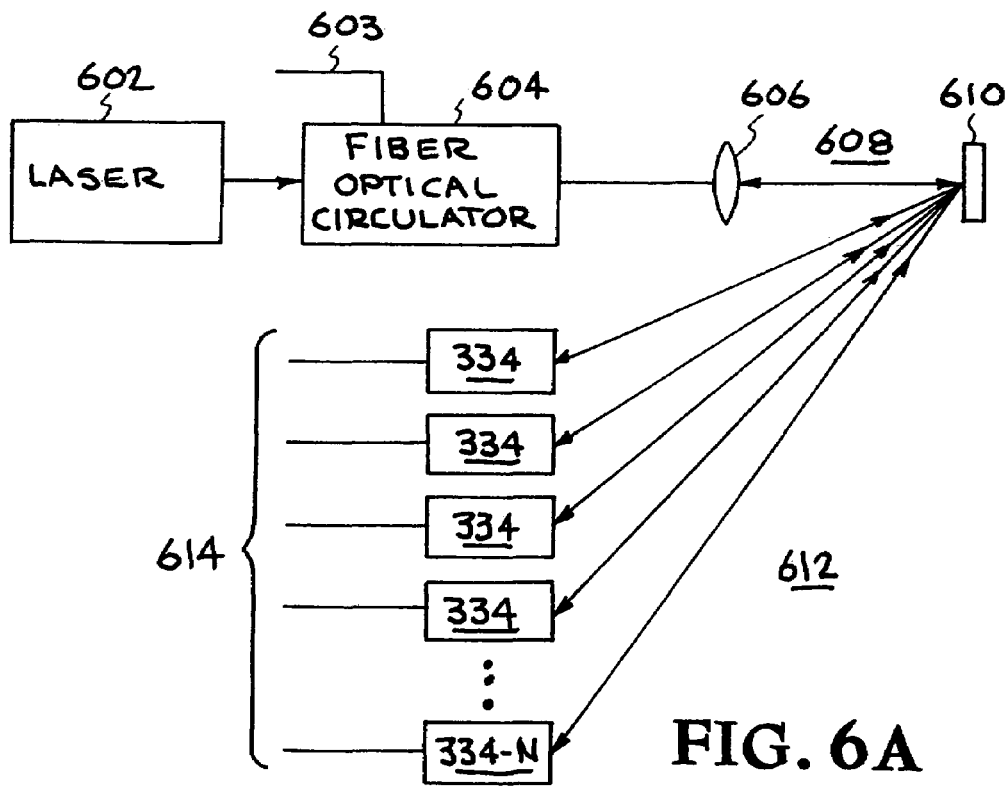
FIG. 6A is block diagram of a system and method of optical interconnection using a plurality of broad area diode laser micro-phase conjugators.

FIG. 6A discloses another embodiment which is a system and method of optical interconnection using a plurality of broad area diode laser micro-phase conjugators 334 (as discussed above). The number of micro-phase conjugators may number from 1 to N depending on the application. In some applications, N may number over approximately 25. In operation, a laser source 602 transmits a beam to a fiber optical circulator 604. Fiber optic circulator is operationally coupled to transmit a beam to and receive a beam from a fiber focusing or collimating lens 606 which directs the beam over a first free space 608 to a position addressable micro-mirror 610. The fiber optical circulator 604 is also coupled to an optical fiber 603 containing encoded data from the micro-phase conjugators 334. The micro-mirror 610 reflects the beam to and receives a beam from a predetermined micro-phase conjugator 334 in the array of micro-phase conjugators 334 over a second free space 612. The micro-phase conjugators 334 may each be connected to a plurality of electrical data lines 614. The micro-phase conjugators 334 may use any of the four approaches discussed above. More specifically, the micro-phase conjugators may be a plurality of commercial single stripe devices (first approach), a VCSEL (second approach), a broad-area, distributed feedback (($\alpha$-DFB) laser device (third approach), or a plurality of modified broad-area, distributed feedback lasers 540 are placed in a stacked or substantially linear array arrangement (fourth approach).

Figure 6B:
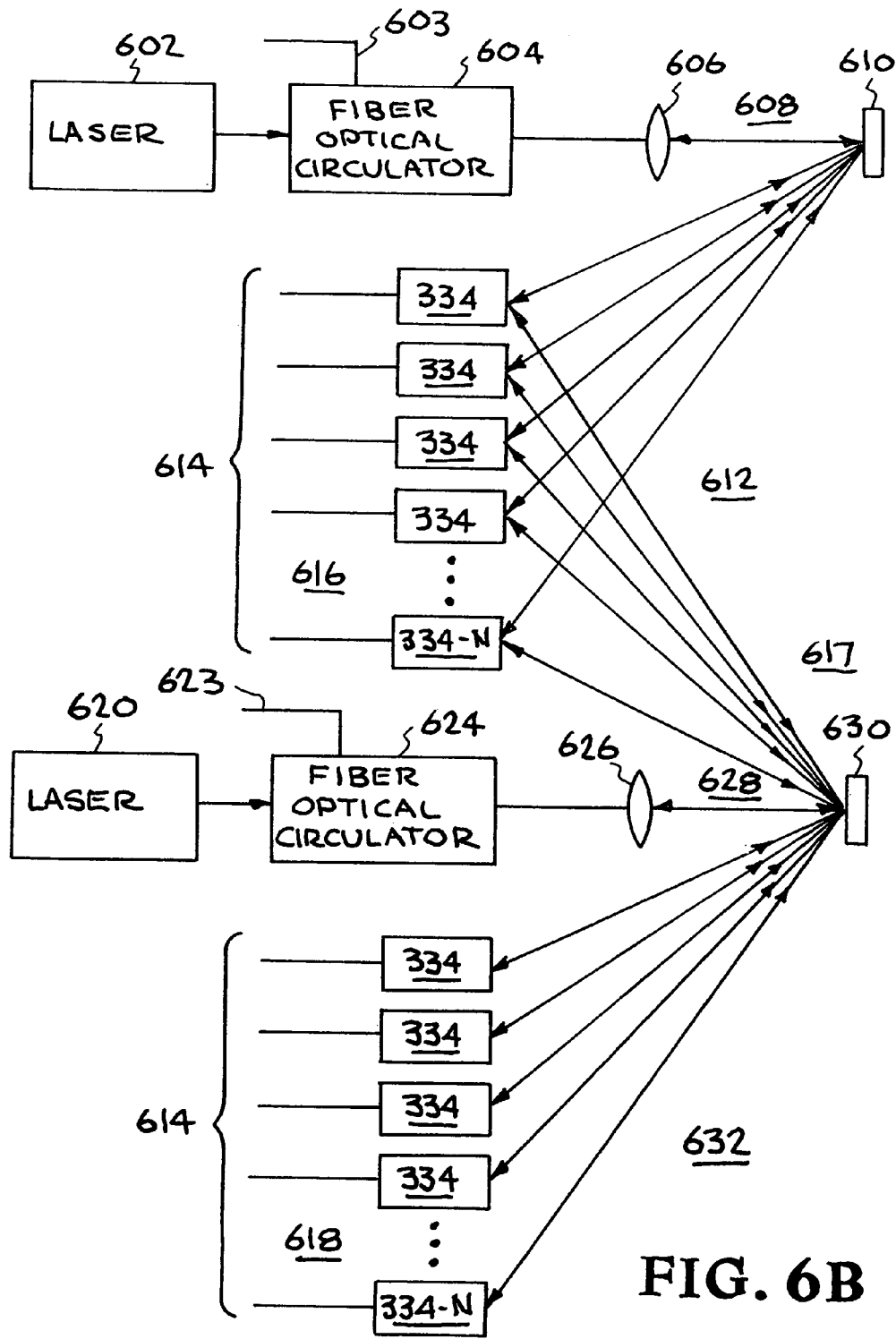
FIG. 6B is block diagram of the system and method of optical interconnection of FIG. 6A repeated to form an N-channel cross-connect.

FIG. 6B is block diagram of the system and method of optical interconnection of FIG. 6A repeated to form an N-channel cross-connect. In operation, a micro-phase conjugator 334 from the first array 616 of micro-phase conjugators 334 transmits a beam across free space 617 to a second micro-mirror 630 (the first micro-mirror being reference numeral 610). The micro-mirror 630 transmits the beam either across free space 628 to fiber focusing (or collminating) lens 626 or across free space 632 to the second array 618 of micro-phase conjugators 334. Similarly, as discussed above, fiber focusing lens 626 is coupled to a fiber optical circulator 624 which is connected to an optical fiber 623 for transmitting data. Fiber optical circulator 624 is also operatively coupled to a laser source 620. Second array 618 is made up of a plurality (1 . . . N) of micro-phase conjugators 334 which are connected to a plurality of electrical data lines 632. As discussed above, the micro-phase conjugators 334 may use any of the four approaches previously mentioned. More specifically, the micro-phase conjugators may be a plurality of commercial single stripe devices (first approach), a VCSEL (second approach), a broad-area, distributed feedback ($\alpha$-DFB) laser device (third approach), or a plurality of modified broad-area, distributed feedback lasers placed in a stacked or substantially linear array arrangement (fourth approach).

Advantages of the methods and systems disclosed herein may include extremely low probability of interception, detection or jamming. Low beam divergence and narrow optical linewidths of both the interrogating laser beacon and its precisely pointed phase conjugate return, coupled with burst mode operation, may make the system substantially undetectable. When operating at approximately 1550 nanometers (nm), the system and method may be out of band (–50 decibels (dB)), for detection with conventional IR sensors and is eye safe at all distances from the transmitter. Other advantages may include lack of spectral congestion and frequency allocation requirements, as well as immunity to electromagnetic interference (EMI).

Further advantages of the methods and systems disclosed herein may include communications at approximately one 1 Kilobits/sec to approximately ten Gbits/sec data rates. Unlike retro-modulators, phase conjugators based on photorefractive crystals, or microelectromechanical (MEMs) retro-reflectors which are intrinsically limited to MegaHertz (MHz) modulation bandwidths at best, carrier relaxation times in semiconductor laser micro-phase conjugators disclosed herein may support extremely wide (GigaHertz (GHz)) bandwidths.

Further advantages of the method and system disclosed herein may include the elimination of pointing and tracking systems on the interrogated end of the laser communications link. The phase conjugating optical semiconductor laser micro-phase conjugator described herein are constructed to adaptively point and track the interrogating laser beacon. The micro-phase conjugators may automatically seek out the intended receiver aperture within the broad field of view of the area illuminated by the beacon using no moving parts. The angular rate of tracking between mobile and stationary communications platforms is roughly determined by the ratio of the system angular resolution to the response time of the nonlinear phase conjugator. Consequently, with its picosecond response time, the embodiments disclosed herein may track a plurality of relevant airborne assets. The overall field of view of the optical semiconductor laser micro-phase conjugators in the disclosed system and method may be determined primarily by the coupling optics and may be as large as approximately 60 degrees.

Further advantages of the method and system disclosed herein may include automatic correction for atmospheric distortion by nonlinear optical phase conjugation which minimizes bit error rates for terrestrial links. Atmospheric turbulence may cause distortion in the wavefront of propagating laser beams that produces beam wander and intensity scintillation effects inducing fades in the optical power collected by the receiver. These power fades may result in severe transmission errors that limit link performance. An alternative approach has been to use complex electronically controlled opto-mechanical adaptive optics systems. As a rule these systems may require a large number of actuators (approximately greater than 100) to achieve adequate, though often suboptimal turbulence compensation over the one kilometer or greater propagation paths of interest. The total size and weight of such systems and their associated hardware with current technology render them impractical in the type of compact communications transceivers proposed herein.

Further advantages of the method and system disclosed herein may include reduction of link range losses due to diffraction effects and atmospheric-induced beam spreading. A principle difficulty in employing modulated retroreflectors is the power returning from a range round trip decreases rapidly with range as $1/R^2$ to $1/R^4$ depending on the range and aperture sizes. This is true even when a perfect retroreflector is used and there is no atmospheric turbulence. Both traditional passive nonlinear optical phase conjugators and MEMs based devices suffer this loss. In addition, non-conjugating retro-reflectors suffer from losses due to atmospherically induced beam spreading. The optical semiconductor laser micro-phase conjugator disclosed herein is an active device that may provide approximately 30 dB internal gain to compensate for range loss. In addition, the diffraction-limited and frequency-shifted phase conjugate return beam may be efficiently coupled back into a single mode erbium-doped fiber amplifier (EDFA) that may also be used as the transmitter, and heterodyned with the diode laser beacon source for additional gains in excess of approximately 40 dB.

Further advantages of the method and system disclosed herein may include minimization of solar background noise allowing operation in the presence of strong daylight with high receiver sensitivity. The embodiments disclosed herein may create comlinks that may be optimized for narrow optical bandwidth operation (less than approximately 100 MHz) by exploiting resonances engineered into the optical semiconductor laser micro-phase conjugators and heterodyne detection at the transceiver. Also, the approximately 1550 nm band that may be used for the optical carrier is also at a minimum in the solar background spectrum.

Further advantages of the method and system disclosed herein may include economical production in extremely compact, robust, easily integrated formats.

The foregoing is illustrative of the present invention and is not to be construed as limiting thereof. The invention is defined by the following claims, with equivalents of the claims to be included therein.

The invention claimed is:

1. A system comprising:
a transceiver constructed to transmit an interrogating beam;
a communications station capable of receiving said interrogating beam; and
said communications station having a plurality of broad area intra-cavity phase conjugators arranged in an array.

2. The system of claim 1 further comprising:
said communication station capable of transmitting an encoded phase conjugate beam to said transceiver from said plurality of phase conjugators.

3. The system of claim 1, wherein said communication station is configured to respond to said interrogating beam by encoding data into a phase conjugate beam in a plurality of semiconductor laser diodes and pumping the encoded phase conjugate beam by intracavity nondegenerate four wave mixing.

4. The system of claim 3, wherein said encoding of said phase conjugate beam is accomplished at rates exceeding approximately 1 kiloHertz.

5. The system of claim 3, wherein said encoding of said phase conjugated beam is accomplished at rates in the range of approximately 1 GHz to approximately 10 GHz.

6. The system of claim 1, wherein said plurality of phase conjugators are arranged in a substantially linear array.

7. The system of claim 1, wherein said plurality of phase conjugators substantially spaced apart.

8. The system of claim 1, wherein said plurality of phase conjugators are single gain stripe devices.

9. The system of claim 1, wherein said plurality of phase conjugators number at least four.

10. The system of claim 1, wherein the plurality of intra-cavity phase conjugators each comprise an aperture sufficient to resolve a substantial portion of the spatial components of the input wavefront of the interrogating beam.

11. The system of claim 1, wherein the the plurality of intra-cavity phase conjugators each comprise an aperture sufficient to resolve greater than approximately 80% of the spatial components of the input wavefront of the interrogating beam.

12. The system of claim 1, wherein the communication station does not have a movable part pointing and tracking system.

13. The system of claim 1, wherein the plurality of phase conjugators each have a top electrode with an aperture.

14. The system of claim 1, wherein the interrogating beam interacts with pump beams operating in the plurality of phase conjugators at a substantially transverse angle.

15. The system of claim 1, wherein the interrogating beam interacts with pump beams operating in the plurality of phase conjugators in a substantially parallel manner.

16. The system of claim 1, wherein the transceiver is mounted on one of the group consisting of a UAV, airplane, HALE, satellite, ground station, and an automobile.

17. The system of claim 1, wherein the communication station is mounted on one of the group consisting of a UAV, airplane, HALE, satellite, ground station, and an automobile.

18. The system of claim 1, wherein said plurality of intra-cavity phase conjugators are arranged in a two dimensional array.

19. The system of claim 1, wherein said plurality of intra-cavity phase conjugators includes:
a non-linear medium for each of said plurality of intra-cavity phase conjugators wherein said non-linear medium is adapted to produce at least two coherent pump beams; and
a means to encode said coherent pump beams.

20. The system of claim 19, wherein said nonlinear medium is a diode structure comprising a broad-area distributed feedback laser device.

21. A system comprising:
a transceiver constructed to transmit an interrogating beam; and
a communication station capable of receiving said interrogating beam; and
said communication station having a broad area, intra-cavity phase conjugator with a top electrode, wherein an aperture is located in said top electrode.

22. The system of claim 21, wherein the interrogating beam interacts with at least one pump beam operating in the phase conjugator at a substantially transverse angle.

23. The system of claim 21, wherein the phase conjugator is a broad-area, distributed feedback laser device.

24. The system of claim 21, wherein the aperture is greater than 10 microns.

25. The system of claim 21, wherein said intra-cavity phase conjugator with said top electrode includes:
a nonlinear medium adapted to produce at least two coherent pump beams; and
a means to encode said coherent pump beams.

26. The system of claim 25, wherein said nonlinear medium is a diode structure comprising a modified broad-area distributed feedback laser device.

27. A system comprising:
a transceiver constructed to transmit an interrogating beam;
a communication station capable of receiving said interrogating beam; and
said communication station having a broad area, intra-cavity phase conjugator which is a VCSEL structure.

28. The system of claim 27, wherein the interrogating beam interacts with at least one pump beam operating in the phase conjugator in a substantially parallel manner.

29. An optical interconnection system comprising:
a fiber optic device constructed to transmit an interrogating beam; and
a micro-mirror adapted to receive said interrogating beam and transmit the beam to a predetermined broad area intra-cavity VCSEL phase conjugator.

30. The system of claim 29, wherein said interrogating beam interacts with at least one pump beams operating in the phase conjugator in a substantially parallel manner.

31. An optical interconnection system comprising:
a fiber optic device constructed to transmit an interrogating beam; and
a micro-mirror adapted to receive said interrogating beam and transmit the beam to a predetermined broad area intra-cavity distributed feedback laser phase conjugator.

32. The system of claim 31, wherein the interrogating beam interacts with at least one pump beam operating in the phase conjugator at a transverse angle.

33. The system of claim 31, wherein said predetermined phase conjugator is one of a plurality of phase conjugators arranged in an array.

34. The system of claim 31, wherein said predetermined phase conjugator is one of a plurality of phase conjugators arranged in a first array of a plurality of arrays of phase conjugators.

35. The system of claim 31, wherein the plurality of phase conjugators are single gain stripe devices.

36. The system of claim 31, wherein the plurality of phase conjugators have apertures located in a top electrode.

37. A system comprising:
a means for transmitting and receiving an interrogating beam;
a communication station operatively coupled to said transmitting and receiving means, wherein the station includes a broad area intracavity phase conjugator for returning a phase conjugate beam to said transmitting and receiving means.

38. A method comprising:
transmitting an interrogating beam from a transceiver;
receiving said interrogating beam at a communication station;
producing a phase conjugate beam of said interrogating beam by a broad area intracavity phase conjugator;
encoding data onto a phase conjugate beam and pumping an encoded phase conjugate reflectivity by nondegenerate four wave mixing; and
transmitting said encoded phase conjugate beam back to the transceiver.

39. A method comprising:
transmitting an interrogating beam from a transceiver;
receiving said interrogating beam at an array of phase conjugators;
producing a phase conjugate beam of said interrogating beam, wherein each of said phase conjugators arranged in said array comprise a broad area intracavity micro phase conjugator;
modulating data onto a phase conjugate beam; and
transmitting the phase conjugate beam to said transceiver.

40. The method of claim 39, further comprising:
collecting data through a sensor located in proximity to said phase conjugators and transmitting said data to said phase conjugators.

41. The method of claim 39, wherein said interrogating beam interacts with at least on pump beam operating in each of said phase conjugators in a substantially parallel manner.

42. The method of claim 39, wherein said interrogating beam interacts with at least one pump beam operating in each of said phase conjugators in a substantially transverse manner.

43. A method comprising:
transmitting an interrogating beam from a transceiver;
receiving said interrogating beam at an array of broad area intra-cavity phase conjugators through apertures located in the top electrodes of the phase conjugators;
modulating data onto a phase conjugate beam; and
transmitting the phase conjugate beam to said transceiver.

44. A method comprising:
transmitting an interrogating beam from a transceiver;
receiving said interrogating beam at an array of broad area intra-cavity phase conjugators and resolving a substantial portion of the spatial components of the input wavefront of the interrogating beam;
modulating data onto a phase conjugate beam; and
transmitting the phase conjugate beam to said transceiver.

* * * * *